United States Patent Office 3,056,797
Patented Oct. 2, 1962

3,056,797
N-(β-HYDROXY,β-[SUBSTITUTED PHENYL])
ETHYL-3-HYDROXYPIPERIDINES
Seymour L. Shapiro, Hastings on Hudson, and Louis Freedman, Bronxville, N.Y., and Kurt Weinberg, Ruschlikon, Switzerland, assignors to U.S. Vitamin and Pharmaceutical Corp., a corporation of Delaware
No Drawing. Filed Oct. 27, 1959, Ser. No. 848,911
3 Claims. (Cl. 260—294.7)

This invention relates to new chemical compounds and more specifically to certain N-(β-hydroxy-β-[substituted phenyl]ethyl-3-hydroxypiperidines and to a method for making them.

The compounds of this invention may be represented by the following general formula:

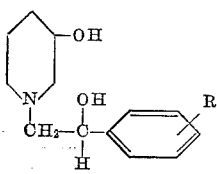

where R is selected from the group consisting of hydrogen, halogen, alkyl, phenyl, alkoxy and acetamino.

It is the object of this invention to describe simple methods for the synthesis of such compounds, and to characterize their useful properties.

These compounds afford desirable synthetic intermediates for further chemical action, as for example, the preparation of esters, ethers and carbamates as well as inorganic esters such as phosphates.

Also, in and of themselves the compounds show a broad spectrum of physiological activities, especially tranquilizing activity, associated with hypotensive activity.

The diastereoisomeric forms of the compounds herein described and the optically active forms while not herein separated are also considered within the purview of this invention.

The new compounds are most conveniently used in the form of water-soluble, nontoxic, acid addition salts, and these salts are within the purview of this invention. The acids which can be used to prepare acid addition salts are those which produce, when combined with the N-substituted-3-hydroxypiperidines of this invention, salts whose anions are relatively innocuous to the animal organism in therapeutic doses of the salts so that the beneficial physiological properties inherent in the compounds are not vitiated by side effects ascribable to the anions. Appropriate acid addition salts are those derived from the mineral acids as hydrochloric acid, hydrobromic acid, hydriodic acid and sulfuric acid, and organic acids such as p-toluenesulfonic acid, citric acid, tartaric acid and the like.

The new N-substituted-3-hydroxypiperidines are conveniently prepared from the N-substituted-3-oxypyridyl betaines described in our co-pending application, Serial No. 608,193, now U.S. Patent 2,909,528, by hydrogenation under conditions as mild as room temperature and 50 pounds of hydrogen pressure. The reactant betaines are represented by the formula

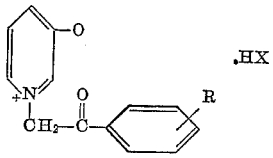

where R has the same significance as described above, and X is halogen. The preferred hydrogenation catalyst is rhodium on carbon which we have found permits the hydrogenation to proceed in the manner desired without side reactions or loss of the piperidine hydroxyl group in the final product. The quantity of rhodium on carbon is not critical and the amount used reflects the desirability of completion of reaction in minimal time without excess usage of the expensive catalyst. Difficulties are experienced when platinum oxide is used as the hydrogenation catalyst in that yields of the desired compound are poor, and side products so far uncharacterized are obtained.

When the theoretical uptake of hydrogen has been obtained the product is isolable directly as the acid addition salt or is converted to the free base, extracted and purified by distillation following conventional procedures.

Under the conditions of hydrogenation, little or no significant reduction of phenyl groups has been observed.

The hydrogenation conditions used will reduce the pyridine group to a piperidine group, and the carbonyl oxygen to a hydroxy group.

One instance wherein the group R was hydrogen, hydrogenolysis of the formed hydroxy group occurred to a minor degree. The following equation illustrates this observation:

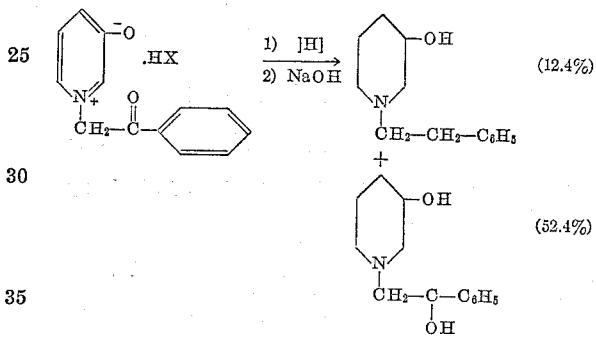

It is obvious that the description above and the specific compounds listed in the examples to follow are intended to be illustrative only, and that these may be varied or modified to a considerable extent without departing from the spirit of the invention or sacrificing the advantages thereof and therefore it is not intended that this invention be limited to the specific embodiments herein set forth.

EXAMPLE 1

N-(β-Hydroxy,β-[p-Phenylphenyl])Ethyl-3-Hydroxypiperidine

To a mixture of 0.024 mole of N-p-phenphenacyl-3-oxypyridyl betaine hydrobromide in 220 ml. of methanol was added 2 g. of 5% rhodium on carbon (the catalyst used throughout these examples is available as 5% rhodium on carbon from Baker & Co., Newark 5, N.J.) and reaction mixture hydrogenated under 50 lbs. hydrogen pressure at room temperature over 24 hours when the theoretical amount of hydrogen uptake was obtained. The catalyst was separated by filtration and washed with 150 ml. of water, and the combined filtrates were evaporated until the methanol was removed, and 200 ml. of 6 N-sodium hydroxide added. This transformed the hydrobromide of the product to its free base which was extracted with two 100-ml. portions of chloroform. The chloroform extracts were combined, dried over anhydrous magnesium sulfate, filtered, the chloroform removed, and the residue distilled in vacuo. The product was obtained as the fraction boiling at 190–206° (0.05 mm.).

Analysis.—Calcd. for $C_{19}H_{23}NO_2$: C, 76.7; H, 7.8; N, 4.7. Found: C, 76.5; H, 7.8; N, 4.9.

On pharmacological testing the product had a minimal lethal dose of 750 mg./kg. subcutaneous. It afforded moderate lasting hypotension, potentiated adrenaline, and gave almost a complete ganglionic block at 5 mg./kg. It caused a 43% decrease in motor activity of test animals when evaluated at 20 mg./kg.

EXAMPLE 2

N-(β-Hydroxy,β-[p-Bromophenyl])Ethyl-3-Hydroxypiperidine

Following the procedure of Example 1, and using N-(p-bromophenacyl)-3-oxypyridyl betaine hydrobromide as the initial reactant, the title product was obtained as an oil, boiling at 125–140° (0.02 mm.).

Analysis.—Calcd. for $C_{13}H_{18}BrNO_2$: C, 52.0; H, 6.0; N, 4.7. Found: C, 52.2; H, 6.1; N, 4.9.

EXAMPLE 3

N-(β-Hydroxy,β-[p-Chlorophenyl])Ethyl-3-Hydroxypiperidine

Following the procedure of Example 1, and using N-(p-chlorophenacyl)-3-oxypyridyl betaine hydrobromide as the initial reactant, the title product was obtained as an oil, boiling point 145–155° (0.03 mm.), which crystallized on standing, recrystallized (heptane), M.P. 104–106°.

Analysis.—Calcd. for $C_{13}H_{18}ClNO_2$: C, 61.1; H, 7.9; N, 5.5; Cl, 13.9. Found: C, 61.8; H, 6.5; N, 5.4; Cl, 14.1.

In a similar manner, other N-substituted phenacyl-3-oxypyridyl betaine hydrohalides are converted to, for example:

N-(β-hydroxy-β-[2,4 - dimethylphenyl])ethyl-3-hydroxypyridine,
N-(β-hydroxy-β-[3,4-dimethoxyphenyl])ethyl-3-hydroxypyridine,
N-(β-hydroxy-β-[p-acetamidophenyl])ethyl - 3 - hydroxypiperidine and the like.

EXAMPLE 4

N-(β-Hydroxy,β-Phenyl)Ethyl-3-Hydroxypiperidine 40.8 g. (0.164 m.) of N-phenacyl-3-oxypyridyl betaine hydrochloride was hydrogenated as described in Example 1 for 13 hours. At this point 62.3 lbs. of hydrogen had been taken up, whereas the theoretical uptake for addition of four molecular equivalents of hydrogen is 59.5 lbs., and for five molecular equivalents of hydrogen is 74.6 lbs. The catalyst was separated and the filtrate concentrated to dryness and the residue treated with 100 cc. of 6 N sodium hydroxide and 100 cc. of ether. The aqueous phase was extracted with the ether, the ether separated, and the aqueous phase reextracted with two additional 200 cc. portions of ether. The ether extracts were combined, dried over anhydrous magnesium sulfate, the ether removed and the residue distilled.

Fraction 1, 5 g. collected at 90–95° C. (0.09 mm.) which crystallized on standing, when recrystallized from hexane melted at 66–67.5° C. and proved to be the N-β-phenylethyl-3-hydroxypiperidine corresponding to complete reduction of the carbonyl group of the phenacyl substituent.

Analysis.—Calcd. for $C_{13}H_{19}NO$: C, 76.1; H, 9.3; N, 6.8. Found: C, 75.6; H, 9.3; N, 6.8.

Fraction II, 22 g. collected at 140–150° C. (0.05 mm.) was the title product corresponding to reduction of the phenacyl group carbonyl oxygen to hydroxyl.

Analysis.—Calcd. for $C_{13}H_{19}NO_2$: N, 6.3. Found: N, 6.4.

This application is a continuation-in-part of our application Serial No. 608,194, filed September 6, 1956.

It is to be understood that it is intended to cover all changes and modifications of the examples of the invention herein chosen for the purpose of illustration which do not constitute departure from the spirit and scope of the invention.

We claim:

1. The compound

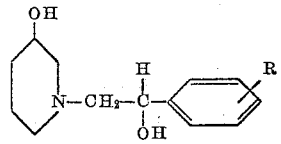

wherein R is selected from the group consisting of hydrogen, chlorine, bromine, methyl and phenyl.

2. The compound

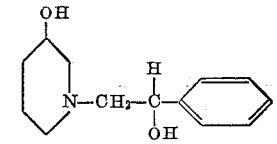

3. The compound

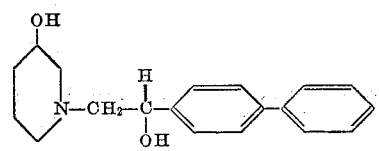

References Cited in the file of this patent

UNITED STATES PATENTS 2,802,007    Biel _____ Aug. 6, 1957

FOREIGN PATENTS

S 28461 IV b/12q    Germany _____ Mar. 8, 1956